United States Patent
Kobayashi et al.

(10) Patent No.: US 6,702,569 B2
(45) Date of Patent: *Mar. 9, 2004

(54) ENHANCING SNCR-AIDED COMBUSTION WITH OXYGEN ADDITION

(75) Inventors: Hisashi Kobayashi, Putnam Valley, NY (US); Kuang Tsai Wu, Williamsville, NY (US); Lawrence E. Bool, III, East Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/194,497

(22) Filed: Jul. 11, 2002

(65) Prior Publication Data

US 2003/0099912 A1 May 29, 2003

Related U.S. Application Data (63) Continuation-in-part of application No. 09/757,611, filed on Jan. 11, 2001, now abandoned.
(60) Provisional application No. 60/380,817, filed on May 15, 2002, and provisional application No. 60/380,818, filed on May 15, 2002.

(30) Foreign Application Priority Data

Dec. 20, 2001 (WO) .................. PCT/US01/48713

(51) Int. Cl.[7] .................. F23M 3/04; F23M 3/02; F23J 11/00
(52) U.S. Cl. .................. 431/10; 431/8; 110/348
(58) Field of Search .................. 431/10, 8, 351; 110/344, 345, 348

(56) References Cited

U.S. PATENT DOCUMENTS

| | | | |
|---|---|---|---|
| 3,656,878 A | 4/1972 | Wright |
| 3,873,671 A | 3/1975 | Reed et al. |
| 3,900,554 A | 8/1975 | Lyon |
| 4,208,386 A | 6/1980 | Arand et al. |
| 4,325,924 A | 4/1982 | Arand et al. |

(List continued on next page.)

FOREIGN PATENT DOCUMENTS

| | | |
|---|---|---|
| DE | 4142401 | 6/1993 |
| EP | 0187441 | 7/1986 |
| EP | 0653590 | 11/1994 |

OTHER PUBLICATIONS

Michelfelder, S. et al., "Transfert de chaleur et pollution", Revue Generale De Thermique, No. 196 (Apr. 1978), p. 324 (with translation).

Sarofim, A.F. et al., "Strategies For Controlling Nitrogen Oxide Emissions During Combustion Of Nitrogen–Bearing Fuels", The American Institute of Chemical Engineers, (1978), No. 175, vol. 74, pp. 67–92.

Timothy, L.D. et al., "Characteristics Of Single Particle Coal Combustion", 19th Symposium on Combustion, The Combustion Institute (1982), pp. 1123–1130.

(List continued on next page.)

Primary Examiner—Alfred Basichas
(74) Attorney, Agent, or Firm—Donald T. Black (57) ABSTRACT

NOx emissions from combustion are reduced, NOx reduction efficiency by SNCR is improved, and other efficiencies are realized, by injecting oxygen into a fuel-rich combustion zone under controlled conditions.

11 Claims, 2 Drawing Sheets

U.S. PATENT DOCUMENTS

| | | |
|---|---|---|
| 4,329,932 A | 5/1982 | Takahashi et al. |
| 4,343,606 A | 8/1982 | Blair et al. |
| 4,388,062 A | 6/1983 | Bartok et al. |
| 4,408,982 A | 10/1983 | Kobayashi et al. |
| 4,427,362 A | 1/1984 | Dykema |
| 4,488,866 A | 12/1984 | Schirmer et al. |
| 4,495,874 A | 1/1985 | Greskovich et al. |
| 4,515,095 A | 5/1985 | Greskovich |
| 4,541,796 A | 9/1985 | Anderson |
| 4,556,384 A | 12/1985 | Laurenceau et al. |
| 4,596,198 A | 6/1986 | Greskovich et al. |
| 4,761,132 A | 8/1988 | Khinkis |
| 4,797,087 A | 1/1989 | Gitman |
| 4,863,371 A | 9/1989 | Ho |
| 4,878,830 A | 11/1989 | Henderson |
| 4,899,670 A | 2/1990 | Hansel |
| 4,946,382 A | 8/1990 | Kobayashi et al. |
| 4,957,050 A | 9/1990 | Ho |
| 4,969,814 A | 11/1990 | Ho et al. |
| 4,973,346 A | 11/1990 | Kobayashi |
| 4,988,285 A | 1/1991 | Delano |
| 5,000,102 A | 3/1991 | Ho |
| 5,076,779 A | 12/1991 | Kobayashi |
| 5,085,156 A | 2/1992 | Dykema |
| 5,158,445 A | 10/1992 | Khinkis |
| 5,186,617 A | 2/1993 | Ho |
| 5,195,450 A | 3/1993 | Marion |
| 5,201,650 A | 4/1993 | Johnson |
| 5,203,859 A | 4/1993 | Khinkis et al. |
| 5,213,492 A | 5/1993 | Ho |
| 5,242,296 A | 9/1993 | Tuson et al. |
| 5,291,841 A * | 3/1994 | Dykema .................... 110/347 |
| 5,308,239 A | 5/1994 | Bazarian et al. |
| 5,387,100 A | 2/1995 | Kobayashi |
| 5,411,394 A | 5/1995 | Beer et al. |
| 5,413,476 A | 5/1995 | Baukal, Jr. et al. |
| 5,439,373 A | 8/1995 | Anderson et al. |
| 5,454,712 A | 10/1995 | Yap |
| 5,601,425 A | 2/1997 | Kobayashi et al. |
| 5,609,662 A | 3/1997 | Kobayashi et al. |
| 5,611,682 A | 3/1997 | Slavejkov et al. |
| 5,611,683 A | 3/1997 | Baukal, Jr. et al. |
| 5,725,366 A | 3/1998 | Khinkis et al. |
| 5,832,847 A | 11/1998 | Leisse et al. |
| 5,871,343 A | 2/1999 | Baukal et al. |
| 5,904,475 A | 5/1999 | Ding |
| 5,924,858 A | 7/1999 | Tuson et al. |
| 5,931,654 A | 8/1999 | Chamberland |
| 6,007,326 A | 12/1999 | Ryan, III et al. |
| 6,030,204 A * | 2/2000 | Breen et al. |
| 6,085,674 A | 7/2000 | Ashworth |
| 6,113,389 A | 9/2000 | Joshi et al. |
| 6,171,100 B1 | 1/2001 | Joshi et al. |
| 6,206,949 B1 | 3/2001 | Kobayashi et al. |
| 6,244,200 B1 | 6/2001 | Rabovitser et al. |
| 6,276,928 B1 | 8/2001 | Joshi et al. |
| 6,289,851 B1 | 9/2001 | Rabovitser et al. |
| 6,314,896 B1 | 11/2001 | Marin et al. |
| 6,325,003 B1 * | 12/2001 | Ashworth et al. .......... 110/345 |
| 6,357,367 B1 * | 3/2002 | Breen et al. ................ 110/345 |
| 6,394,790 B1 | 5/2002 | Kobayashi |
| 6,398,546 B1 | 6/2002 | Kobayashi |
| 6,409,499 B1 | 6/2002 | Feldermann |
| 6,418,865 B2 | 7/2002 | Marin et al. |
| 6,519,973 B1 | 2/2003 | Hoke, Jr. et al. |

OTHER PUBLICATIONS

Farmayan, W.F. et al., "$NO_x$ and Carbon Emission Control in Coal–Water Slurry Combustion", Sixth International Symposium on Coal Slurry Combustion and Technology, Orlando, FL, (1984).

"Oxygen Enriched Air/Natural Gas Burner System Development", Final Report, Gas Research Institute (1989), pp. 140 and 186–189.

Kobayashi, H. et al., "$NO_x$ Emission Characteristics of Industrial Burners and Control Methods Under Oxygen Enriched Combustion Conditions", International Flame Research Foundation, $9^{th}$ Members Conference, Noordwijkerhout (1989).

Baukal, C.E. et al., "$NO_x$ Measurements In Oxygen–Enriched, Air–Natural Gas Combustion Systems", Fossil Fuel Combustion Symposium, (Amer. Soc. Mech. Eng., 1990), pp. 75–79.

Baukal, C.E. et al., "Oxygen Enrichment Enhances Combustion", Air Products and Chemicals, Inc., (before 1992), pp. 17–23.

Panahi, S.K. et al., "Low–$NO_x$ Technologies For Natural Gas–Fired Regenerative Glass Melters", presented at Scandinavian Society of Glass Technology, Institute of Gas Technology (1992), pp. 1–15.

"Catalog of Technical Reports", Gas Research Institute, (Dec. 1992).

Eddings, E.G. et al. "Advances in the Use of Computer Simulations for Evaluating Combustion Alternatives", presented at the $3^{rd}$ CREST International Symposium on High Temperature Air Combustion and Gasification, Yokohama, Japan (Mar. 2000).

Takano, S. et al. "$CO_2$ Recovery from PCF Power Plant with $O_2/CO_2$ Combustion Process", IHI Engineering Review, Oct. 1995, pp. 161–164.

Campbell, D.A. et al. "Oxy–coal injection at Cleveland Ironworks", Ironmaking and Steelmaking, 1992, vol. 19 No. 2, pp. 120–125.

Riley, M.F. "Effect of Direct Oxygen Injection on Combustion of Injected Coal", Proc. $2^{nd}$ Internat. Cong. on the Sci. and Tech. of Ironmaking, ISS, 1998, pp. 683–688.

* cited by examiner

ENHANCING SNCR-AIDED COMBUSTION WITH OXYGEN ADDITION

This application is a continuation-in-part of application Ser. No. 09/757,611 filed Jan. 11, 2001 now abandoned, and claims priority from U.S. Provisional Application Ser. No. 60/380,817 filed May 15, 2002 and U.S. Provisional Application Ser. No. 60/380,818 filed May 15, 2002. The entire contents of said three applications are hereby incorporated herein by reference.

This invention was made with United States Government support under Cooperative Agreement No. DE-FC26-00NT40756 awarded by the Department of Energy. The United States Government has certain rights in the invention.

FIELD OF THE INVENTION

The present invention relates to the combustion of hydrocarbonaceous fuel such as coal in, for instance, a furnace for generation of power, and to the reduction of generation of oxides of nitrogen in the course of that combustion.

BACKGROUND OF THE INVENTION

Combustion of coal in the furnaces of power plants continues to be a significant means of generating energy. As that combustion continues to be believed to cause atmospheric emissions of NOx which continue to be considered to contribute to atmospheric pollution, there is still substantial interest in identifying ways to reduce the amount of NOx emitted to the atmosphere in the course of that combustion.

One known method to reduce NOx emissions from boilers and furnaces is to inject a reagent such as ammonia, urea, cyanuric acid or ammonium carbonate into the combustion chamber, whereupon the reagent forms amine radicals ($—NH_2$) at high temperature and reacts with NO present in the high temperature combustion gases in the combustion chamber to form $N_2$. This method is well known as the selective non-catalytic reduction (SNCR) process and is described in numerous aspects in the prior art. Prominent among SNCR processes are those described by Lyon in U.S. Pat. No. 3,900,554 and by Arand et. al. in U.S. Pat. Nos. 4,208,386 and 4,325,924. Recent improvements in the SNCR process include those described in U.S. Pat. No. 6,030,204 and U.S. patent application Publication No. US 2002/0025285 A1. Ammonia and urea are the preferred reagents. For effective reduction of NOx, the reagent has to be mixed uniformly with the combustion gases containing NOx within the space and residence time available for each combustion process. Uniform mixing is a difficult practical problem as the molar ratio of the reagent to flue gas is on the order of 1,000 to 10,000 for flue gas containing 100 to 1000 ppm of NOx.

The efficiency of NOx reduction by the SNCR process is strongly dependent on the temperature at which the reaction is carried out. The effective reaction temperature is conventionally believed to be about 1600 to 2000 F.; carried out at this temperature, the SNCR reaction can provide NOx reduction of up to 90% in a small well mixed system. However, in large boilers the SNCR reaction provides maximum NOx reduction of about 55 to 60% due to the large temperature gradient within a boiler and also to the physical limitations to achieving uniform mixing and to providing adequate mixing time. The ideal gas temperature at which to inject the-reducing reagent into a boiler is typically believed to be between 1800–2000 F., considering the rapid cooling that the flue gas undergoes as it approaches the convective section of the boiler. The amount of NOx reduction achieved drops sharply at temperatures below or above the 1800–2000 F. range. Emissions of unreacted reagent, conventionally termed "ammonia slip", is a problem at lower temperatures and the sharp drop of NOx reduction efficiency is the problem at higher temperature.

Unfortunately, in conventional furnaces such as utility boilers, the temperature of the gases (composed chiefly of gaseous combustion products and nitrogen) as they exit the combustion zone of the furnace (i.e. the zone where the combustion of the fuel takes place) and enter the reduction zone (where the injection and reaction of the SNCR reagent occurs) is typically about 2100 to 2300 F. As a result, NOx reduction of only 15 to 30% is typically achieved even when the reagent is mixed well with the flue gas.

Up to now, attempting to remedy this situation by lowering the temperature of the gaseous combustion products leaving the combustion zone risks sacrificing the efficiency or output of the furnace, without cumbersome and expensive modifications to the entire system. Although the amount of NOx reduction can be improved to a certain degree by increasing the amount of ammonia or other reagent that is fed to the reduction zone, this is an expensive solution. On the other hand, adding conventional means such as low-NOx burners and over fire air ports for lowering NOx formation (thereby lessening the amount of reagent that needs to be injected) are generally understood to delay the combustion process and increase the temperature of the combustion products leaving the combustion zone. Thus, the overall efficiency of the SNCR process suffers even with the lessened reagent requirements.

In the SNCR process, reagent is injected from an array of nozzles to achieve good mixing with the hot furnace gas located in the optimum temperature range available for the boiler or the furnace. For boiler applications, the zone at the end of the radiant section is the preferred location. Gas temperature is dropping rapidly as it flows from the radiant furnace section to the convective bank; however, injection of the reagent within the convective bank is impractical because of the heat exchanger tubes found there. The location and distribution of the reagent injection nozzles are the most important parameter as the reagent, typically supplied as an aqueous solution, must be atomized, vaporized, mixed with flue gas, and reacted with NO within the relatively short residence time available in the tail end of the boiler furnace. Injection velocity, directions, and droplet size distributions all influence the efficiency of NOx reduction and need to be optimized for each boiler. Since the gas temperature changes with the boiler load, reagent nozzles are often located in multiple levels and the injection level is controlled as the optimum temperature range shifts.

Flue gas recirculation (FGR) in the upper furnace zone is an effective way to cool down the flue gas and is sometimes used to control the steam temperature at the superheater. In this method flue gas after the air heater is recirculated by an induced draft fan. This technique, however, presents the technical issue of the wear to and maintenance of the FGR fan caused by the ash in the flue gas. The economics is another issue, because of the expense of installing the large fan that would be necessary to handle warm flue gas (about 400 to 500 F.) and the expense of the power required for recirculation.

It is also possible to inject a diluent to cool down the gaseous combustion products leaving the combustion zone. A water spray could be used as an effective coolant. However, any addition of diluents, other than recirculated flue gas, would result in a significant energy penalty and reduce the thermal efficiency of the boiler.

Thus, there remains a need for methods that provide the benefits of the SNCR process while achieving, and not sacrificing, other benefits.

BRIEF SUMMARY OF THE INVENTION

The present invention satisfies this need and affords the advantages described herein. According to the invention, hydrocarbonaceous fuel is combusted in a furnace having a combustion zone, burner means for combusting hydrocarbonaceous fuel in said combustion zone to generate heat of combustion and gaseous combustion products containing NOx, feed means for feeding said fuel and combustion air to said burner means, and a reduction zone downstream from said combustion zone into which said gaseous combustion products pass from said combustion zone, wherein combustion products at a temperature above 1900 F. arepresent in said reduction zone, and a reducing reagent is injected into said reduction zone and reacts there with NOx in said combustion products to form $N_2$ and thereby lessen the amount of NOx that would otherwise be emitted from said furnace. Oxygen is fed into said fuel, by injecting it directly into said fuel as said fuel emerges from said burner or by adding it to the air that is fed through said burner, while reducing the amount of combustion air fed through said burner by an amount containing sufficient oxygen that the overall combustion zone stoichiometric ratio varies by not more than 10% compared to the stoichiometric ratio without said addition of oxygen, and combusting the fuel in said air and said oxygen, wherein the amount of said oxygen is sufficient to lower the temperature of said combustion products passing into said reduction zone but not to a temperature below 1800 F., and the amount of said oxygen is less than 25% of the stoichiometric amount required for complete combustion of said fuel.

Preferably, air is added from a source other than said burner into a region within said combustion chamber outside said fuel-rich zone, in an amount containing at least sufficient oxygen that the total amount of oxygen fed into said combustion chamber is at least the stoichiometric amount needed for complete combustion of said fuel.

While the combustion products in some region(s) of the reduction may be below 1900 F., some are above that temperature. The injection of oxygen as described herein brings about a reduction of the temperature of the combustion products that pass into the reduction zone, while also providing the other advantages described herein.

In some preferred embodiments, particularly those wherein said fuel contains bound nitrogen, said combustion is staged with a low NOx burner and the fuel rich flame zone stoichiometric ratio is between 0.6 and 1.0, or said combustion is staged with over fire air and the primary combustion zone stoichiometric ratio is between 0.6 and 1.0.

In other preferred embodiments, a stream of fuel is fed through said burner and oxygen is fed into said fuel by injecting it through a lance positioned in said stream, into the fuel as the fuel emerges from the burner. In yet other preferred embodiments, a stream of fuel is fed through an annular fuel passage of said burner, and oxygen is fed into said fuel by injecting it through an annular passage surrounding or surrounded by said annular fuel passage.

In the most preferred embodiments, the fuel is coal.

The invention provides numerous advantages.

Emission of NOx per unit of energy generated is reduced. Consumption of the SNCR reagent is reduced for the same amount of NOx reduction. The thermal efficiency of the furnace improves: more heat is transferred, thereby lowering the flue gas temperature. Also, more energy is recovered from the same input of fuel, which also enables fuel input to be reduced slightly while maintaining the same overall heat transfer to the boiler tubes. The combined process reduces the NOx emissions through the unexpectedly synergistic combination of two processes.

As used herein, "stoichiometric ratio" means the ratio of oxygen fed, to the total amount of oxygen that would be necessary to convert fully all carbon, sulfur and hydrogen present in the substances comprising the feed to carbon dioxide and sulfur dioxide, and water.

As used herein, "NOx" means oxides of nitrogen such as but not limited to NO, $NO_2$, $NO_3$, $N_2O$, $N_2O_3$, $N_2O_4$, $N_3O_4$, and mixtures thereof.

As used herein, "bound nitrogen" means nitrogen that is part of a molecule that also contains carbon and hydrogen and optionally also oxygen.

As used herein, "reducing reagent" means any nitrogenous compound that reacts with NO at 1900° F. to form reaction products that contain $N_2$.

As used herein, "staged combustion with low NOx burners" means combustion in a furnace wherein mixing with fuel of a portion of the combustion air required for complete combustion of the fuel is delayed to produce a flame with a relatively large fuel rich flame zone.

As used herein, "globally staged combustion or staged combustion with over fire air" means combustion in a furnace wherein a portion of the combustion air (the "over fire air") required for complete combustion of the fuel is fed to the furnace not through or immediately adjacent any burner but instead through one or more inlets situated between the burner(s) and the furnace flue means, and is fed without an associated feed of fuel.

DETAILED DESCRIPTION OF THE INVENTION

The invention will be described with reference to the Figures, although a description that refers to the Figures is not intended to limit the scope of that which is considered to be the present invention.

Figure 1:
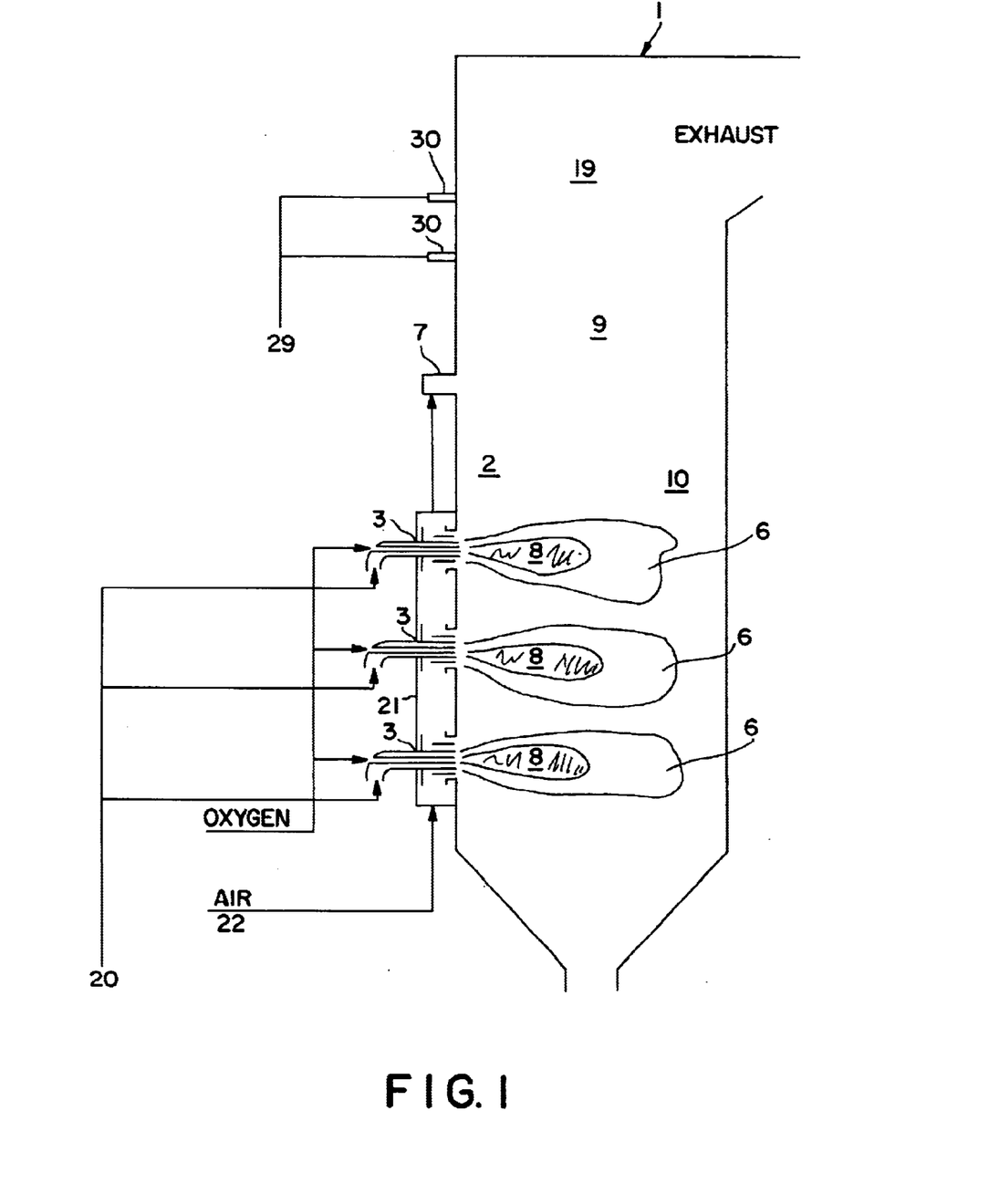
FIG. 1 is a cross-sectional representation of one embodiment of apparatus for carrying out the present invention.

FIG. 1 shows combustion device 1 with an SNCR zone, which can be any apparatus wherein combustion is carried out in the interior 2 of the device. Preferred combustion devices include furnaces and boilers which are used to generate steam by conventional means, not shown.

Each burner 3 in a sidewall or end wall of combustion device 1 feeds fuel, air and oxygen from sources thereof outside the combustion device 1 into the interior 2 of combustion device 1. Suitable fuels include hydrocarbon liquids, such as fuel oil, and also include pulverulent hydrocarbon solids, a preferred example of which is pulverized coal or petroleum coke. Preferably, the fuel contains bound nitrogen.

Figure 2:
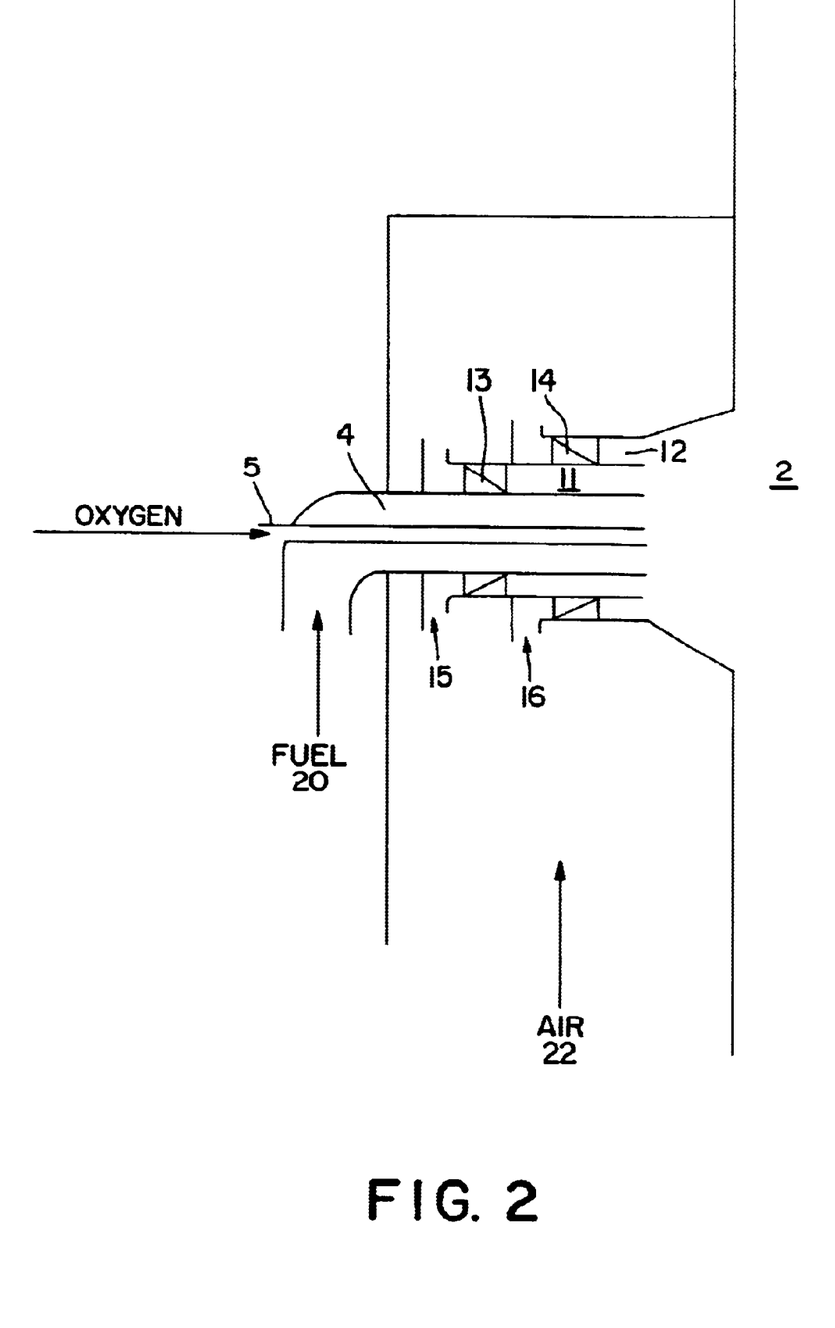
FIG. 2 is a cross-sectional representation of a burner useful for carrying out the present invention.

As seen in FIG. 1 and more closely in FIG. 2, burner 3 is preferably comprised of several concentrically arranged passages, although other constructions to the same effect can be used. The fuel is fed into combustion device 1 through annular passage 4, disposed concentrically around lance 5 through which oxygen is fed as described herein. Preferably, the fuel is transported from a supply source 20 to one or more burners 3 and propelled through burner 3 into the interior 2 of combustion device 1, by suitable pump means in the case of liquids such as fuel oil, and by blowers and impellers of conventional design in the case of hydrocarbon solids such as pulverized coal, which are conventionally fed into the combustion device with the aid of a gaseous carrier such as, preferably, transport air or primary air. Liquid hydrocarbon fuels are preferably fed through one or more atomizing nozzles of conventional design, to feed the liquid fuel into the combustion chamber as discrete, dispersed droplets with atomizing air. An effective amount typically about 1.5 to 2.0 lb of primary air is used to transport 1 lb of coal, which corresponds to about 20% of the stoichiometric combustion air required for complete combustion of bituminous coal. For combustion of heavy oil about 0.5 to 1.0 lb of primary air is typically used to atomize 1 lb of oil.

Combustion air 22 is supplied by a forced draft ("FD") fan to one or more windboxes 21 and fed to air passages of one or more burners 3. Secondary combustion air 15 is fed through burner 3 into combustion device 1, preferably through concentrically arranged annular passages 11 surrounding the annular space 4 through which the hydrocarbon fuel is fed. Preferably tertiary combustion air 16 is fed through burner 3 into combustion device 1, preferably through concentrically arranged annular passages 12 surrounding the secondary air passage. Preferably combustion air is also fed through over fire air port 7 (seen in FIG. 1) into combustion device 1. Preferably, the oxygen is fed into the interior 2 of the device apart from the secondary and tertiary combustion air. That is, the oxygen that is fed through burner 3 in accordance with this invention is preferably not commingled with the secondary and tertiary combustion air before or after it is fed into combustion device 1, especially when no over fire air is used.

Preferred low NOx burners have primary (fuel), secondary and tertiary air passages for good aerodynamic adjustability. However, other low NOx burner designs using only primary and secondary air feeds can be used. Once the optimum settings with the three passages have been determined, the secondary air swirl vanes and passage can be designed to create about the same aerodynamic mixing characteristics as with the three-passage design. Alternatively, burners with an additional (quaternary) passage can be used (such as the RSFC™ burner described in U.S. Pat. No. 5,960,724).

Before a combustion device is retrofitted in accordance with the present invention to reduce the formation of NOx formed in the operation of the combustion device, lance 5 for feeding oxygen is not yet present. Combustion is carried out between the hydrocarbon fuel and the oxygen that is present in the combustion air, resulting in formation of a flame 6. The region 8 of the flame closest to the end of burner 3, that is, where the hydrocarbon fuel emerges from the burner, is a fuel-rich zone. The area of the flame 6 around its periphery, is relatively lean, as secondary and tertiary combustion air has not been fully reacted with fuel. When a sufficient amount of air is fed from over fire air port 7 for global combustion staging, the entire lower zone of the furnace, or primary combustion zone (PCZ) 10, below over fire air port 7 becomes fuel rich, except the areas near burners 3 where air is injected and not yet fully reacted with fuel.

Preferably, air is also fed through over fire air port opening 7 into the interior of combustion device 1, to make the primary combustion zone 10 more fuel rich and to provide additional oxygen helping to achieve complete combustion of the fuel in the burnout zone 9 (which should be considered part of the combustion zone). The oxygen in the combustion air fed through burner 3, combined with the oxygen fed at opening 7, are sufficient to enable complete combustion of the fuel, and typically contain 10 to 15 volume percent excess oxygen over the amount required for the complete combustion of the fuel.

Reduction zone or SNCR zone 19 downstream of burnout zone 9 receives the combustion products. Into reduction zone 19, reducing reagent is injected from multiple nozzles 30 from source 29 by any conventional means. Examples of preferred reducing reagents include ammonia, urea, cyanuric acid, inorganic and organic ammonium salts such as ammonium carbonate, and mixtures thereof. The amount of reducing reagent added, expressed as the molar ratio of $NH_3$ to NO, should be in the range of 0.5 to 3.0 and preferably 0.8 to 1.5.

Preferably, the secondary and tertiary combustion air are fed at the burner 3 so as to swirl about a longitudinal axis, thereby creating a recirculation zone near each burner and improving commingling of air and fuel. Swirl can be achieved by known techniques, such as providing deflectors, 13 and 14, in the annular passages for secondary and tertiary air flow of the burner which direct the flow of the streams in the desired swirling direction. It is preferred to provide a high degree of swirl, preferably a swirl number, as defined in "Combustion Aerodynamics", J. M. Beer and N. A. Chigier, Robert E. Krieger Publishing Company, Inc., 1983, of 0.6 to 2.0.

Preferably the total amount of air fed through burner 3, i.e., the sum of primary, secondary and tertiary air, is between 60 and 95% of the stoichiometric air requirement for complete combustion. Most preferably the total amount of air fed through burner 3 is about 70 to 85% of the stoichiometric air requirement for complete combustion.

The velocity of each stream of combustion air is preferably 50 to 200 feet per second. The velocity of the oxygen injected through lance 5 is preferably within 50% to 200% of the velocity of the primary air.

Tests have suggested that a preferred approach is to expose at least some of the fuel particles or droplets to a high concentration of oxygen as opposed to uniformly enriching the overall combustion air. The simple approach of injecting oxygen into the windbox 21 of a low NOx burner such that the enriched air is fed to the entire burner, including the critical primary stage air, is not considered effective.

When oxygen is premixed or mixed rapidly into the coal transport stream using 20% of stoichiometric air and the overall combustion stoichiometric ratio is 1.15, the following average concentrations of oxygen in the transport air stream and in the overall combustion air are calculated.

| % SR air replaced with $O_2$ (*) | $O_2$ concentration in transport air (vol. %) | Avg. $O_2$ concentration in total combustion air (vol. %) |
| --- | --- | --- |
| 0  | 21.0 | 21.0 |
| 5  | 24.9 | 21.7 |
| 10 | 28.5 | 22.5 |
| 15 | 31.7 | 23.4 |
| 20 | 34.7 | 24.3 |
| 25 | 37.4 | 25.4 |

(* e.g. 5 cf of dry air replaced with 1.05 cf of pure $O_2$ to give the same amount of $O_2$)

Due to the small amount of oxygen used, only modest increases in the oxygen concentration of air are achieved when mixed uniformly even when oxygen is mixed only with the transport air. A preferred method is to inject oxygen into the coal/air transport stream at the tip of the nozzle. In this case some of the coal particles are mixed with oxygen jets and locally create zones of coal high $O_2$ mixture. Such conditions may provide zones of rapid ignition sources and facilitate early ignition and devolatilization as compared to the case oxygen is premixed with the transport air stream.

Another preferred method is to inject oxygen from the inner or outer annular space adjacent to the coal stream. In this case the favorable oxygen rich combustion condition is provided at the boundary of the coal and oxygen streams.

When oxygen is injected separately at high velocity parallel to the fuel stream, as was the case for Farmayan, et al., ("NOx and Carbon Emission Control in Coal-Water Slurry Combustion", Sixth International Symposium on Coal Slurry Combustion and Technology, Orlando, Fla., Jun. 25–27, 1984), the oxygen jet(s) may be diluted quickly with surrounding gases and its effectiveness may be retarded. Thus, the method of oxygen injection has to be carefully designed.

The present invention improves, that is, lessens, the formation of NOx in the combustion device by feeding oxygen into the entering hydrocarbon fuel stream as described herein. More specifically, the oxygen (by which is meant a gaseous stream comprising at least 50 vol. % $O_2$, preferably at least 80 vol. % $O_2$, most preferably at least 90 vol. % $O_2$), is fed directly into the hydrocarbon fuel as it emerges from the burner and enters the interior 2 of combustion device 1. Thus, at least some of the particles of solid fuel, or the droplets of liquid fuel, as the case may be, enter the combustion device and the fuel-rich portion of flame 6, in a gaseous atmosphere containing a high concentration of oxygen.

When over fire air is used for global combustion staging, preferably with air burners equipped with four separate air passages, oxygen may be premixed with the primary or secondary air or both, using suitable spargers within the gas passages in burner 3.

The oxygen is preferably fed through a lance 5 or similar feed line that can be open at the end that opens into combustion device 1, or that is closed at the end and has numerous openings in its periphery adjacent that closed end, such that oxygen flows out through those openings directly into the hydrocarbon fuel entering the combustion device from the burner.

The amount of oxygen fed in this manner should be sufficient to establish a stoichiometric ratio in the fuel-rich zone 8 of flame 6 which is preferably less than about 0.85. The amount of oxygen fed through line 5 should be preferably less than 25% of the stoichiometric amount required for the complete combustion of the fuel. More preferably, the amount corresponds to less than 15% of the stoichiometric amount required for complete combustion of the fuel.

At the same time, the amount of secondary and tertiary combustion air fed through burner 3 into combustion device 1, need to be decreased by an amount corresponding to the amount of oxygen fed via lance 5. More specifically, the amount of secondary and tertiary combustion, and quaternary, if used, air fed through burner 3 should be reduced by an amount containing within 10% of the amount of oxygen fed via line 5 into the fuel, when the amount of the over fire air, if used, is kept constant. When a deeper global staging is used with oxygen injection, the amount of secondary and tertiary combustion, and quaternary, if used, air fed through burner 3 should be reduced by an amount containing more than the amount of oxygen fed via line 5 into the fuel, while increasing the amount of the over fire air so as to maintain the overall stoichiometric ratio of combustion within 10% of the value before the oxygen injection.

NOx emission strongly depends on the local stoichiometric conditions. As injection of oxygen makes the local stoichiometric condition leaner, one has to consider the change in the local stoichiometric conditions after the oxygen injection. For example, injection of oxygen, equivalent to 10% of the stoichiometric air, into a locally rich zone at a stoichiometric ratio of 0.4 (SR=0.4), without changing the combustion air, would alter the local stoichiometric conditions to SR=0.5 and would be expected to decrease NOx emissions substantially. Such an effect is much greater than that from "replacing 10% air with oxygen" while keeping the local stoichiometric condition constant at SR=0.4. If the same amount of oxygen is injected into the flame zone, without changing the amount of combustion air being fed, where the local stoichiometric condition is SR=0.95, NOx emission is expected to increase, sharply if the local stoichiometric condition is increased to SR=1.05.

Thus, it is generally preferred to inject oxygen into the richest area of the flame.

Injection or mixing of oxygen into the tertiary air and quaternary, if used, should be avoided in an aerodynamically staged burner without OFA. In theory the optimization of local stoichiometric condition can be done with any oxidants including air. However, oxygen is more effective because only a small volume is required and local stoichiometric condition can be changed without a large impact on the overall aerodynamic mixing conditions of the flame.

Another important requirement is that oxygen enrichment has to be done in such a way as to preserve or enhance the physical size of the fuel rich zone (the "$N_2$ forming zone") of an aerodynamically staged flame. The method of oxygen injection and the consequent reduction of air flows in certain air passages of a burner would influence the aerodynamic staging conditions of the burner, and hence the physical size and the local stoichiometric conditions. If the size of the fuel rich zone is reduced and the average gas residence time in the fuel rich zone is reduced as a result of oxygen injection, such a change could cause NOx increases. For example, high velocity injection of oxygen through an axial lance would effectively increase the axial momentum of the surrounding coal/air stream, which in turn may enhance the mixing with secondary and tertiary air. As a result the size of the fuel rich NOx reduction zone of the flame may be reduced and NOx may increase. On the other hand when the oxygen flow is injected radially from an axially located oxygen lance near the tip of the burner, it may effectively increase the recirculation zone near the burner and hence increase the size of the fuel rich zone and further promote NOx reduction by oxygen enrichment. Complex impacts of oxygen injection on the burner aerodynamic conditions have to be evaluated carefully for a specific burner to achieve NOx reduction.

Without intending to be bound by any particular explanation of the unexpected performance of this invention, the performance of the combustion device operated in accordance with this invention is consistent with a mechanism in which the injected oxygen causes an increase in the temperature of that portion of the flame closest to the burner, which in turn causes relatively volatile components present in the hydrocarbon fuel to enter the gas phase from the fuel and undergo partial reaction with the ambient oxygen, thereby creating a relatively reducing atmosphere that enables nitrogen-containing species released from the combusting fuel to be converted to molecular nitrogen, that is, $N_2$, rather that converted to NOx compounds.

Typically, the temperature of the fuel-rich zone into which the fuel and the oxygen enter is on the order of 2500° F. or higher. Feeding the oxygen in this manner can cause the base of flame 6 to draw nearer to the opening of burner 3, or even to become attached to burner 3. However, feeding the oxygen in the manner described herein into the hydrocarbon fuel as it emerges from the burner proceeds in the same manner, even if the flame becomes attached to the burner. In steady state operation, for instance after a combustion device has been retrofitted in accordance with the teachings herein, operation of the combustion device continues on the basis that preferably less than 25%, more preferably less than 15%, of the stoichiometric amount of oxygen required for the complete combustion of the fuel is fed into the fuel, while combustion air is fed through the burner in an amount less than otherwise would be the case, so that the total amount of oxygen fed into the device is at least the stoichiometric amount needed for complete combustion of the fuel.

EXAMPLE 1

Table 1 illustrates the NOx reduction achievable by SNCR with and without the addition of oxygen as described herein. In this example the NOx reduction by oxygen is assumed to be 30% of the baseline and the NOx reduction by SNCR is also assumed to be 30% of the baseline with an ammonia to nitric oxide injection molar ratio of 1. It is further assumed that % NOx reduction by SNCR is increased to 40% at the same injection ratio when combined with oxygen due to the gas temperature reduction.

TABLE 1

Example of NOx Reduction by SNCR with and without $O_2$ addition

|  | Combined Process | SNCR only |
|---|---|---|
| NOx (lb/MMBtu) Baseline | 0.4 | 0.4 |
| NOx (lb/MMBtu) After O2 | 0.28 |  |
| NOx (lb/MMBtu) After SNCR | 0.168 | 0.28 |
| SNCR % NOx Reduction | 40 | 30 |
| NH3 consumption (lb/MMBtu) | 0.108 | 0.148 |

The above example shows that NOx reduction from 0.4 lb/MMBtu to 0.28 lb/MMBtu is achieved either by SNCR or by oxygen injection alone. When the two processes are combined the final NOx emissions are reduced to 0.168 lb/MMBtu. Furthermore, the amount of reagent used in the combined process is reduced by 30%, from 0.148 to 0.108 lb of $NH_3$ per MMBtu of fuel input, as compared with the SNCR alone case.

EXAMPLE 2

The invention is described in detail in the following example simulated by a computer model of a boiler furnace.

A 220 MW, based on thermal input, tangentially fired boiler is fired with a bituminous coal from Pittsburgh #8 (Pit #8) coal seam for Cases 1, 1a, 1b, and 1c and with a lower rank sub-bituminous coal from Powder River Basin (PRB) in Wyoming for Cases 2, 2a, 2b 2c. The coal properties are summarized in Table 2.

TABLE 2

|  | Pit #8 | PRB |
|---|---|---|
| Proximate Analysis (%, wet) |  |  |
| Moisture | 5.2 | 28.7 |
| V.M | 38.1 | 32.0 |
| F.C | 48.1 | 33.7 |
| Ash | 8.6 | 5.6 |
| Total | 100 | 100 |
| Ultimate Anaysis (%, dry) |  |  |
| C | 74.0 | 68.30 |
| H | 5.1 | 4.91 |
| N | 1.6 | 1.00 |
| O | 7.9 | 17.25 |
| S | 2.3 | 0.70 |
| ASH | 9.1 | 7.84 |
| Total | 100 | 100 |
| HHV (btu/lb, wet) | 12540 | 8650 |

In Table 3, operating characteristics of the boiler are summarized for the following six cases.

Case 1. Baseline operation with bituminous coal (Pit #8) with air

Case 1a, 1b, 1c. Operation with bituminous coal (Pit #8) with oxygen injection at reduced fuel input, but at the same steam output Case 2. Baseline operation with sub-bituminous coal (PRB) with air Case 2a, 2b, 2c. Operation with sub-bituminous coal (PRB) with oxygen injection at reduced fuel input, but at the same steam output In the baseline operation, Case 1, 60,372 lb/hr of bituminous coal was fired with 9,144,000 SCFH of combustion air which contains 20.67% oxygen and 1.5% moisture by volume. The total heat input corresponds to 756.6 MMBtu/hr based on higher heating value (HHV) and the overall stoichiometric ratio was set at 1.18 to provide 3% excess $O_2$ in the flue gas. 50% of the moisture in the coal was vaporized in the pulverizer and the transport line to the burner. About 20% of stoichiometric combustion air was used to transport the pulverized used as secondary air for combustion and preheated to 522° F. in the air heater. No over fire air ports were used to stage the combustion. In the radiant furnace section, 342.5 MMBtu/hr of heat was absorbed to the boiler waterwalls, generating steam. Furnace exist gas temperature (FEGT) was 2,144° F. 71.6 and 85.2 MMbtu/hr of heat was transferred to the finishing superheater section and the reheater section respectively and the flue gas temperature was reduced to 1520° F. Then, flue gas passed through the primary superheater/economizer section and the air heater and was exhausted from a stack. The boiler efficiency was 83.5% based on HHV of the fuel input. With FEGT of 2,144° F., NOx reduction by SNCR was estimated to be 15%.

TABLE 3

Boiler Operations

|  | Case 1 | Case 1a | Case 1b | Case 1c | Case 2 | Case 2a | Case 2b | Case 2c |
|---|---|---|---|---|---|---|---|---|
| Case Definition: | | | | | | | | |
| Coal type | Pit. #8 | Pit. #8 | Pit. #8 | Pit. #8 | PRB | PRB | PRB | PRB |
| % of moisture vaporized in mill | 50 | 50 | 50 | 50 | 50 | 50 | 50 | 50 |
| In-duct burner (Y/N) | N | N | N | N | Y | Y | Y | Y |
| O2 % in oxidant | 20.67 | 21.38 | 22.09 | 22.80 | 20.67 | 21.38 | 22.09 | 22.80 |
| Air preheat (F.) | 522 | 509 | 496 | 483 | 522 | 512 | 504 | 498 |
| Furnace Operation: | | | | | | | | |
| Coal flow (lb/hr) | 60372 | 59765 | 59247 | 58731 | 87522 | 86555 | 85782 | 84957 |
| Firing rate (MMBtu/hr, HHV) | 756.6 | 749.0 | 742.5 | 736.0 | 756.6 | 748.2 | 741.5 | 734.4 |
| In-duct burner (MMBtu/hr, HHV) | 0.0 | 0.0 | 0.0 | 0.0 | 14.6 | 14.5 | 14.4 | 14.2 |
| Oxidant flow (SCFH) | 9144000 | 8710885 | 8315947 | 7953390 | 9054000 | 8611378 | 8214228 | 7848213 |
| Flue Gas Temperatures (F.): | | | | | | | | |
| Furnace exit (FEGT) | 2144 | 2137 | 2125 | 2116 | 2092 | 2087 | 2084 | 2078 |
| Leaving reheater | 1520 | 1502 | 1489 | 1473 | 1506 | 1489 | 1482 | 1469 |
| Leaving economizer | 850 | 822 | 797 | 772 | 851 | 825 | 808 | 786 |
| Heat Absorptions (MMBtu/hr): | | | | | | | | |
| Waterwalls | 342.5 | 350.8 | 358.7 | 365.7 | 320.3 | 326.7 | 334.0 | 340.7 |
| Finishing superheater | 71.6 | 70.0 | 68.5 | 67.2 | 70.0 | 68.6 | 67.5 | 66.3 |
| Reheater | 85.2 | 82.2 | 79.6 | 76.9 | 84.0 | 82.2 | 79.7 | 77.4 |
| Primary superheater + Economizer | 132.2 | 128.5 | 125.0 | 121.8 | 136.3 | 132.5 | 129.0 | 125.8 |
| Total | 631.5 | 631.5 | 631.8 | 631.6 | 610.6 | 610.0 | 610.2 | 610.2 |
| Boiler Efficiency: | | | | | | | | |
| Gross (% of HHV coal heat input) | 83.5 | 84.3 | 85.1 | 85.8 | 80.7 | 81.5 | 82.3 | 83.1 |
| Net (% of HHV coal + NG input) | 83.5 | 84.3 | 85.1 | 85.8 | 79.2 | 80.0 | 80.7 | 81.5 |

In Case 1a, 1b and 1c, oxygen was injected to improve the heat transfer condition by replacing 5%, 10% and 15% of stoichiometric combustion air with oxygen respectively. These oxygen inject rates correspond to oxygen enriched air with an average oxygen concentration of 21.38%, 22.09%, and 22.80% respectively. In order to maintain the same steam output the coal firing rate was reduced to 749.0, 742.5 and 736.0 MMBtu/hr respectively. The overall stoichiometric ratio was adjusted to maintain 3% excess $O_2$ in the flue gas. No other changes were made to the boiler operation.

In Cases 1a, 350.8 MMBtu/hr of heat was absorbed to the boiler waterwalls, generating steam. Furnace exist gas temperature (FEGT) was reduced by 7° F. to 2137° F. 70.0 and 82.2 MMBtu/hr of heat was transferred to the finishing super heater section and the reheater section respectively and the flue gas temperature was reduced to 1502° F. In the primary superheater/economizer section, 128.5 MMBtu/hr of heat was absorbed and the flue gas temperature was reduced to 822° F. Although the same total heat was absorbed to generate superheated steam, the heat absorption by the waterwalls was increased by about 2.4% as compared with the baseline case due to enhanced radiative heat transfer with oxygen injection. On the other hand the heat absoprtion at the convective banks (superheater, reheater and economizer sections) was reduced by about 2.9% due to the reduced mass flow rate of the flue gas. Air preheat temperature was reduced by 13 F. from the baseline temperature of 522 F. to 509° F. and the fuel input was reduced by 1.0% for the same steam output. The combination of lower fuel input and lower air preheat resulted in the improvement of boiler thermal efficiency by 0.8% to 84.3%, based on the higher heating value of the fuel. With FEGT of 2137° F., NOx reduction by SNCR was estimated to be at 17.5%, which shows a 2.5% improvement over the baseline NOx reduction by SNCR of 15%.

As more oxygen was injected in Cases 1b and 1c, more heat was absorbed in the water walls and the FEGT was further reduced to 2125 and 2116° F respectively. The boiler thermal efficiency was improved by 1.6% and 2.3% respectively based on constant total heat absorption. NOx reduction by SNCR was estimated to be at 21.5% and 25% respectively, which represents a 6.5% and 10% improvement over the baseline value of 15%.

Cases 2, 2a, 2b, 2c show the results of the same boiler fired with the sub-bituminous PRB coal. In Case 2, 87,522 lb/hr of sub-bituminous coal was fired with 9,054,000 SCFH of combustion air to maintain the same total heat input of 756.6 MMBtu/hr as the baseline case with the bituminous coal. The overall stoichiometric ratio was adjusted at 1.19 to provide 3% excess O2 in the flue gas. About 20% of stoichiometric combustion air was used to transport the pulverized coal as primary air and the temperature was maintained at 153 F. In order to vaporize about 50% of the moisture contained in the as received coal in the coal pulverizer and the transport lines, in-duct burners were used and 14.6 MMBtu/hr of natural gas was consumed. The balance of the air was used as secondary air for combustion and preheated to 522° F. in the air heater. No other changes were made to the boiler operation. In the radiant furnace section, 320.3 MMBtu/hr of heat was absorbed to the boiler waterwalls, generating steam. Furnace exit gas temperature (FEGT) was 2,092° F. 70.0 and 84.0 MMBtu/hr of heat was transferred to the finishing super heater section and the reheater section respectively and the flue gas temperature was reduced to 1506° F. Heat fluxes to the primary superheater/economizer section was 136.3 MMBtu/hr and the flue gas temperature leaving the economizer was 851° F. The boiler efficiency was 80.7% based on HHV of the coal input. The net boiler efficiency including the HHV of the natural gas used to dry the coal was 79.2%.

In Cases 2a, 2b and 2c, oxygen was injected to improve the heat transfer condition by replacing 5%, 10% and 15% of stoichiometric combustion air with oxygen respectively. These oxygen inject rates correspond to oxygen enriched air with an average oxygen concentration of 21.38%, 22.09%, and 22.80% respectively. In order to maintain the same steam output the coal firing rate was reduced to 748.2, 741.5 and 734.4 MMBtu/hr respectively. The overall stoichiometric ratio was adjusted to maintain 3% excess $O_2$ in the flue gas. No other changes were made to the boiler operation.

The effects of oxygen injection with the PRB coal on boiler efficiency improvement were very similar to those with bituminous coal. However, the effects on both the flue gas temperature drop and the estimated NOx reduction by SNCR were less pronounced that those with the bituminous coal. NOx reduction by SNCR was estimated to be 33, 34.5, 35.5 and 37.5% for Cases 2, 2a, 2b and 2c respectively. The data shown in the table indicate that similar results are to be expected with other fuels such as natural gas and oil. Thus, the synergistic effects of combining SNCR and oxygen injection are applicable to different fuels.

What is claimed is:

1. In the combustion of hydrocarbonaceous fuel in a furnace having a combustion zone, burner means for combusting hydrocarbonaceous fuel in said combustion zone to generate heat of combustion and gaseous combustion products containing NOx, feed means for feeding said fuel and combustion air to said burner means, and a reduction zone downstream from said combustion zone into which said gaseous combustion products pass from said combustion zone, wherein combustion products at a temperature greater than 1900 F. are present in said reduction zone, and a reducing reagent is injected into said reduction zone and reacts there with NOx in said combustion products to form $N_2$ and thereby lessen the amount of NOx that would otherwise be emitted from said furnace, the improvement comprising feeding oxygen into said fuel, by injecting it directly into said fuel as said fuel emerges from said burner or by adding it to the air that is fed through said burner, while reducing the amount of combustion air fed through said burner by an amount containing sufficient oxygen that the overall combustion zone stoichiometric ratio varies by not more than 10% compared to the stoichiometric ratio without said addition of oxygen, and combusting the fuel in said air and said oxygen, wherein the amount of said oxygen is sufficient to lower the temperature of said combustion products passing into said reduction zone but not to a temperature below 1800 F., and the amount of said oxygen is less than 25% of the stoichiometric amount required for complete combustion of said fuel.

2. A method according to claim 1 wherein said fuel contains bound nitrogen.

3. A method according to claim 1 wherein said fuel contains bound nitrogen and said combustion is staged with a low NOx burner and the fuel rich flame zone stoichiometric ratio is between 0.6 and 1.0.

4. A method according to claim 1 wherein said fuel contains bound nitrogen and said combustion is staged with over fire air and the primary combustion zone stoichiometric ratio is between 0.6 and 1.0.

5. A method according to claim 1 wherein a stream of fuel is fed through said burner and oxygen is fed into said fuel by injecting it through a lance positioned in said stream, into the fuel as the fuel emerges from the burner.

6. A method according to claim 1 wherein a stream of fuel is fed through an annular fuel passage of said burner, and oxygen is fed into said fuel by injecting it through an annular passage surrounding or surrounded by said annular fuel passage.

7. A method according to claim 1 wherein said fuel is coal.

8. A method according to claim 7 wherein said coal contains bound nitrogen and said combustion is staged with a low NOx burner and the fuel rich flame zone stoichiometric ratio is between 0.6 and 1.0.

9. A method according to claim 7 wherein said combustion is staged with over fire air and the primary combustion zone stoichiometric ratio is between 0.6 and 1.0.

10. A method according to claim 7 wherein a stream of coal is fed through said burner and oxygen is fed into said coal by injecting it through a lance positioned in said stream, into the coal as the coal emerges from the burner.

11. A method according to claim 7 wherein a stream of coal is fed through an annular fuel passage of said burner, and oxygen is fed into said coal by injecting it through an annular passage surrounding or surrounded by said annular fuel passage.

* * * * *